United States Patent [19]

Faust et al.

[11] Patent Number: 5,451,647

[45] Date of Patent: Sep. 19, 1995

[54] LIVING CARBOCATIONIC POLYMERIZATION PROCESS

[75] Inventors: Rudolf Faust, Lexington, Mass.; Hsien-Chang Wang, Bellaire, Tex.; Miklos Gyor, Budapest, Hungary

[73] Assignees: Exxon Chemical Patents Inc., Linden, N.J.; University of Massachusetts Lowell, Lowell, Mass.

[21] Appl. No.: 958,406

[22] Filed: Oct. 8, 1992

Related U.S. Application Data

[63] Continuation-in-part of Ser. No. 730,363, Jul. 15, 1991, abandoned.

[51] Int. Cl.⁶ .......................... C08F 4/16; C08F 10/10
[52] U.S. Cl. .................................. 526/147; 526/135; 526/204; 526/209; 526/210; 526/213; 526/216; 526/346; 526/348.7; 526/912; 525/268; 525/319
[58] Field of Search ............... 526/147, 237, 141, 135, 526/912, 204, 209, 210, 213, 216; 525/268, 319; 585/527

[56] References Cited

U.S. PATENT DOCUMENTS 4,946,899  8/1990  Kennedy et al. .................. 525/244

FOREIGN PATENT DOCUMENTS 0397081  11/1990  European Pat. Off. .

OTHER PUBLICATIONS

Journal of Macromolecular Science–Chemistry, vol. A18, No. 1, issued 1982 (Dekker Journals, New York), J. P. Kennedy et al., "Carbocationic Polymerization in the Presence of Sterically Hindered Bases", see pp. 1–152.

Primary Examiner—Fred Teskin
Attorney, Agent, or Firm—Myron B. Kurtzman; John E. Scheider

[57] ABSTRACT

An olefin polymerization process is provided wherein an olefin chargestock is contacted with an organic compound polymerization initiator, a Lewis acid coinitiator and a pyridine compound such as 2,6-di-tert-butylpyridine to produce homopolymers, copolymers or block copolymers having a narrow molecular weight distribution.

13 Claims, 8 Drawing Sheets

LIVING CARBOCATIONIC POLYMERIZATION PROCESS

This is a Continuation-in-Part of U.S. application Ser. No. 730,363 filed Jul. 15, 1991 now abandoned.

BACKGROUND OF THE INVENTION

1. Field of the Invention

The present invention relates to a process for the polymerization of olefins. The process is a living polymerization process. The term "living polymerization" is used herein to describe a polymerization process which is theoretically terminationless and which is not susceptible to chain transfer.

2. Description of Information Disclosures

Living polymerization processes are known.

U.S. Pat. No. 4,910,321 discloses a living carbocationic polymerization process utilizing initiation systems containing an organic acid or ester and a Lewis acid which may be $TiCl_4$, although the preferred Lewis acid is $BCl_3$, to produce homopolymers, random copolymers, block copolymers and the like.

U. S. Pat. No. 4,908,421 discloses a living cationic polymerization process for producing a terminally functional polymer utilizing a catalyst system containing a Lewis acid and an organic peroxy compound wherein the monomer charge comprises isobutylene and the organic peroxy compound in an amount ranging from $10^{-4}$ to $10^{-1}$ moles per mole of the isobutylene. The Lewis acid may be $TiCl_4$. See also European patent application 8930737377.5 filed Jul. 29, 1989, now Publication No. 0355997 published Feb. 28, 1990.

U.S. Pat. No. 4,946,899 discloses a living cationic polymerization process for producing block copolymers of isobutylene and styrene based monomer. The process utilizes an electron pair donor to ensure the formation of the block copolymer and prevent homopolymerization of the styrene monomer.

It has also been proposed to obtain narrow molecular weight distribution polyisobutylenes by utilizing a $BCl_3$/ester initiator and a 2,6-di-tert-butyl pyridine proton trap.

It has now been found that an olefin polymerization process conducted in the presence of a specified initiator system yields polymers having improved properties as will become apparent in the ensuing description.

SUMMARY OF THE INVENTION

In accordance with the invention, there is provided a process for polymerizing an olefin which comprises the step of contacting an olefin chargestock with (A) an organic compound selected from the group consisting of an alcohol, an ester, an ether, an organic halide and mixtures thereof;
(B) a Lewis acid;
(C) a pyridine compound selected from the group consisting of 2,6-di-tert-butylpyridine, a substituted 2,6-di-tert-butylpyridine, and mixtures thereof, at polymerization conditions in a polymerization zone, to produce a polymer.

DETAILED DESCRIPTION OF THE INVENTION

Figure 1:
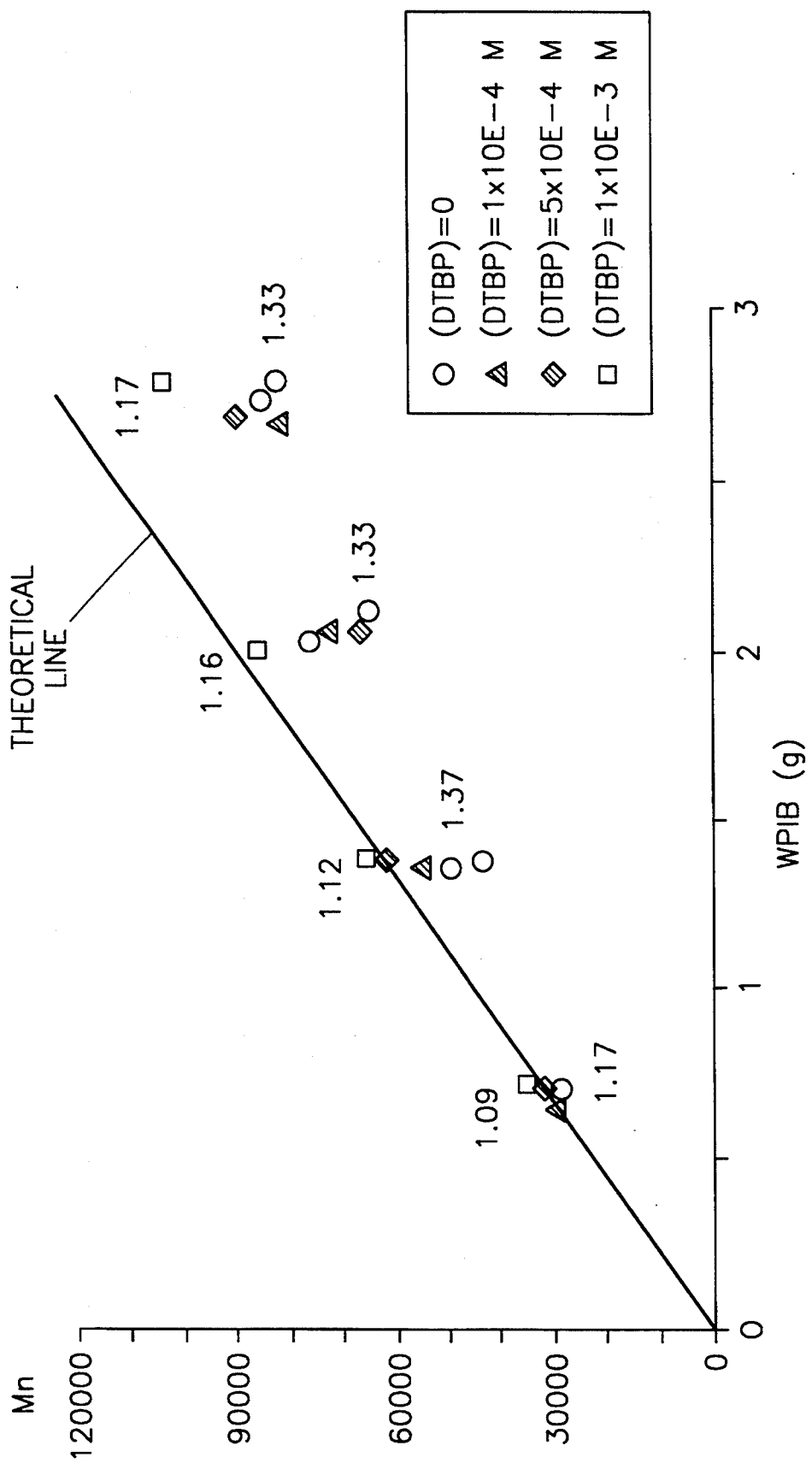
FIG. 1 is a graph showing the number average molecular weight (Mn) versus weight in grams of polyisobutylene formed [WPIB(g)] in the polymerization of isobutylene in the presence of a specified initiator system.

The process of the present invention comprises contacting a chargestock containing a single type of olefins or more than one type of olefins in a polymerization zone at polymerization conditions with a initiator system comprising polymerization initiator, herein referred to a Component A, a coinitiator, herein referred to as Component B, and a proton trap, herein referred to as Component C to produce olefin derived polymers having a narrow molecular weight distribution (MWD). The resulting polymerization is a living polymerization process. It should be noted that without the proton traps described below, the polymerization systems would not be living systems.

The Initiator System

The initiator system comprises Component A, Component B, and Component C.

Component A—The Initiator

Component A is an organic compound polymerization initiator selected from the group consisting of an alcohol, an ester, an ether, an organic halide and mixtures thereof. Suitable alcohols include alcohols represented by the formula:

$$R-(OH)_n$$

wherein R is an alkyl group, a substituted alkyl group, an aryl group, a substituted aryl group, having from 2 to 20, preferably 9 to 15 carbon atoms, and n ranges from 1 to 20, preferably from 1 to 4.

Suitable esters include esters represented by the formula:

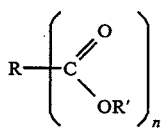

wherein R and R' are independently selected from the group consisting of an alkyl group, a substituted alkyl group, an aryl group, a substituted aryl group, having from 2 to 20, preferably 9 to 15 carbon atoms, and n ranges from 1 to 20, preferably from 1 to 4.

Suitable ethers include ethers represented by the formula R—(—O—R')$_n$, wherein R and R' are independently selected from the group consisting of an alkyl group, a substituted alkyl group, an aryl group, a substituted aryl group, having from 2 to 20 preferably 9 to 15 carbon atoms, an n ranges from 1 to 20, preferably from 1 to 4.

Suitable organic halides include organic halides represented by the formula

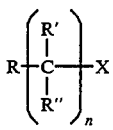

wherein R, R' and R" are each independently selected from the group consisting of an alkyl group, and a substituted alkyl group, an aryl group, a substituted aryl group, having from 2 to 20, preferably 9 to 15 carbon atoms and n ranges from 1 to 20, preferably from 1 to 4, and wherein X is a halogen selected from the group consisting of chlorine, bromine and mixtures thereof. The alkyl group, in the above given formulas may be a saturated alkyl group or an unsaturated alkyl group, e.g. an allyl group.

Component B—The Co-Initiator

Component B is a Lewis acid co-initiator. Suitable Lewis acids include $BCl_3$, $BF_3$, $AlCl_3$, $SnCl_4$, $TiCl_4$, $SbF_5$, $SeCl_3$, $ZnCl_2$, $FeCl_3$, $VCl_4$, $AlR_nCl_{3-n}$, wherein R is an alkyl group and n is less than 3, and mixtures thereof. The preferred Lewis acid for use in the present invention is $TiCl_4$. Desirably, the amount of Lewis acid relative to the amount of Component A (initiator) is selected to be at least equal to a stoichiometric amount. Preferably, the number of moles of Lewis acid ranges from about 2 to about 40 times the stoichiometric amount relative to Component A.

Component C

Component C, a proton trap, is a pyridine compound selected from the group consisting of 2,6-di-tert-butyl-pyridine (DTBP), substituted 2,6-di-tert-butylpyridine and mixtures thereof.

Suitable substituted 2,6-di-tert-butyl-pyridines include 2,6-di-tertiarybutylalkylpyridines such as, for example, 2,6-di-tert-butyl-4-methylpyridine.

When protic impurities (e.g., moisture, acids) are present in the polymerization zone, the pyridine compound is preferably present in at least a stoichiometric amount relative to the protic impurities. More preferably, the pyridine compound is present in an amount greater than the stoichiometric amount relative to the protic impurities.

The Olefinic Chargestock

The olefinic (monomer) chargestock comprises at least a single type of olefin or it may comprise more than one type of olefins depending on the desired final polymer. Suitable olefins include a $C_4$ to $C_7$ isomonoolefin, a $C_4$ to $C_{14}$ multiolefin, a vinylidene aromatic compound which may be substituted or unsubstituted, and mixtures thereof. The preferred $C_4$ to $C_{17}$ isomonoolefin is isobutylene. The preferred $C_4$ to $C_{14}$ multiolefin is isoprene.

The preferred vinylidene aromatic compound is selected from the group consisting of styrene, alkylstyrene and mixtures thereof. The preferred alkylstyrenes are a para-methyl-styrene, and an alphamethylstyrene.

When the olefinic chargestock comprises a $C_4$ to $C_7$ isomonoolefin such as isobutylene and a $C_4$ to $C_{14}$ multiolefin such as a conjugated diolefin, the molar ratio of isomonoolefin to multiolefin may range from about 1000:1 to about 10:1, preferably from about 200:1 to about 40:1.

Block polymers may also be produced by the polymerization of the present invention, for example, by the sequential addition of an isomonoolefin and a second monomer such as a conjugated diolefin (see, for example, U.S. Pat. No. 4,910,261, the teachings of which are hereby incorporated by reference) or a vinylidene aromatic compound.

The process of the present invention may be conducted in the presence or in the absence of a diluent. Suitable diluents include $C_1$ to $C_4$ halogenated hydrocarbons, such as methyl chloride and methylene dichloride, $C_5$ to $C_8$ aliphatic hydrocarbons, such as pentane, hexane, and heptane and $C_5$ to $C_{10}$ cyclic hydrocarbons, such as cyclohexane and methyl cyclohexane, and mixtures thereof.

The order of addition of Component A, Component B, and Component C to the olefinic chargestock is not critical. For example, Component A and Component B may be premixed, optionally in a diluent, and added to the olefinic chargestock which may also comprise an optional diluent.

A preferred order of addition is as follows: diluent (if present), olefin chargestock, Component A (initiator), Component C (proton trap), Component B (co-initiator).

The polymerization process is conducted in a polymerization zone of a conventional polymerization apparatus, in the presence or in the absence of a diluent. Suitable polymerization conditions include a temperature ranging from about minus 100° C. to about plus 10° C., preferably from about minus 80° C. to about 0° C. for a time period ranging from about 1 to about 180 minutes (hours). Preferably, the polymerization reaction mixture may be subjected to agitation using conventional mixing means.

The polymers produced by the process of the present invention may be homopolymers, copolymers, terpolymers, etc., block copolymers and the like depending upon the olefinic chargestock used.

The number average molecular weight ($\overline{Mn}$) of the polymers of the present invention may range from about 500 to about 2,000,000, preferably from about 20,000 to about 300,000. The polymers have a narrow molecular weight distribution such that the ratio of weight average molecular weight to number average molecular weight ($\overline{Mw}/\overline{Mn}$) of the polymers ranges from about 1.0 to about 1.5, preferably from about 1.0 to about 1.2. The polymers may be recovered from the polymerization zone effluent and finished by conventional methods.

The following examples are presented to illustrate the invention.

EXAMPLE 1

A series of polymerization experiments were carried out in large test tubes immersed into a heptane bath ($-80°$ C.) under nitrogen atmosphere in a MBraun M-150 glove box. Total volume of the reaction mixture was 25 ml. Addition sequence of the reactants was as follows: diluent mixture—monomer—initiator—proton trap—coinitiator. AMI (All Monomer In), and IMA (Incremental Monomer Addition) experiments were carried out. Using the AMI technique, parallel runs were quenched at different reaction times. From the yield of the polymers and gel permeation chromatography (GPC) data, the percent conversion-time dependencies, $\overline{M}_w/\overline{M}_n$, and initiator efficiency were obtained. Simultaneously, control runs were carried out in which only the coinitiator and proton trap were charged in the absence of an initiator. Negligible amount of polymer (3%) was obtained in the control runs.

In Example 1, polymerization of IB (isobutylene) was initiated with 5-tert.-butyl-1,3-dicumyl-methylether in the presence of DTBP by the IMA technique. The results are summarized in FIG. 1 which shows polymerization of IB initiated with 5-tert.-butyl-1,3-dicumyl-methylether in the presence of DTBP. IMA technique; Time between monomer additions: 30 mins; [t-Bu-DiCuOMe]=$9.25\times10^{-4}$ M; [TiCl$_4$]=$1.48\times10^{-2}$M; $V_o$=25 mL. Diluent: CH$_3$Cl:n-Hexane, 40:60 v:v; Temperature: $-80°$ C. In FIG. 1 number average molecular weight ($\overline{M}_n$) is plotted against WPIB (g), that is, weight in grams of polyisobutylene formed and the numbers on the plot are molecular weight distribution (MWD) values.

The IMA method means incremental monomer addition. The AMI method, All Monomer In, means that all the monomer is added before the start of the polymerization, as described in R. Faust, and J. P. Kennedy, J. Polymer Science, Polymer Chem. A25, 1847 (1987).

EXAMPLE 2

Figure 2:
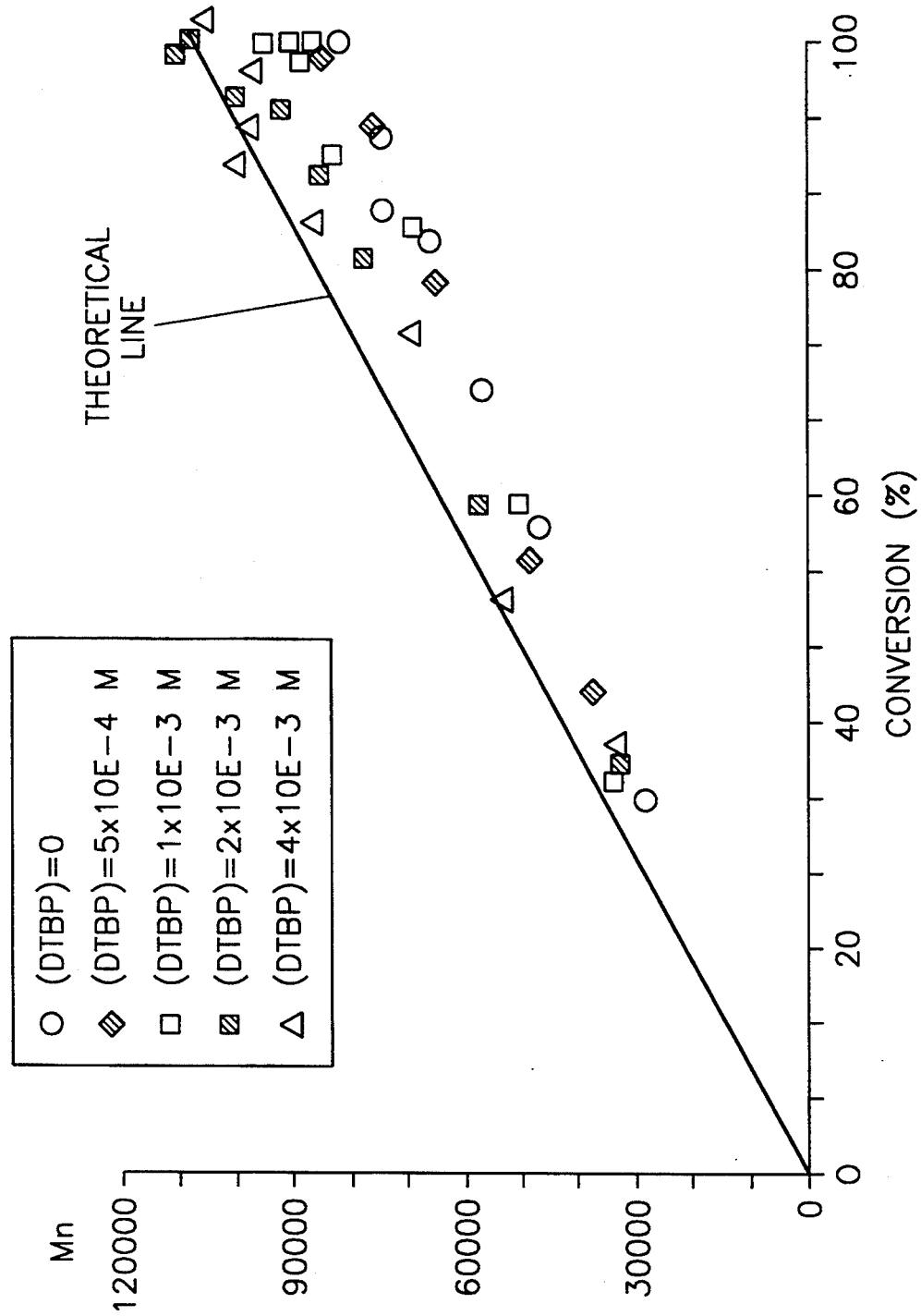
FIG. 2 is a graph showing the number average molecular weight versus monomer conversion (%) in the polymerization of isobutylene and a specified initiator system.

Polymerization experiments were also carried out using the AMI technique under the same experimental conditions as in Example 1 utilizing IB chargestock in the presence of DTBP and as initiator 5-tert.-butyl-1,3-dicumyl-methyl ether, as follows: in the presence and in the absence of DTBP, Initiator: 5-tert.-butyl-1,3-dicumyl-methylether using AMI technique. [IB]$_o$=2.04M [t-Bu-DiCuOMe]=$1\times10^{-3}$M; [TiCl$_4$]=$1.6\times10^{-2}$M; $V_o$=25 mL. Diluent: CH$_3$Cl:n-Hexane, 40:60 (v:v); Temperature: $-80°$ C. The results are summarized in FIG. 2 in which number average molecular weight ($\overline{M}_n$) is plotted against conversion (%) of the monomer to the polymer.

EXAMPLE 3

Figure 3:
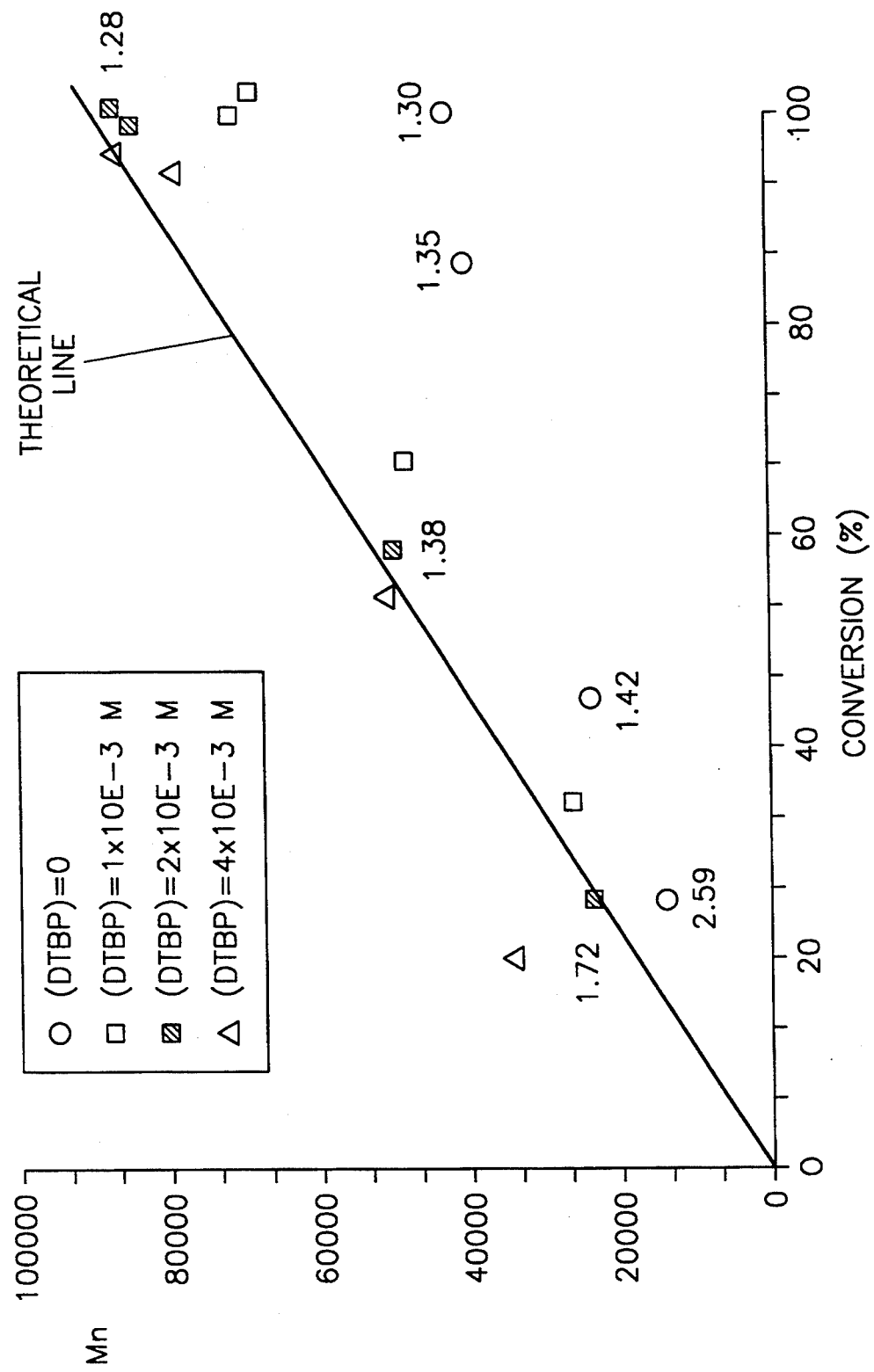
FIG. 3 is a graph showing the number average molecular weight versus monomer conversion (%) in the polymerization of isobutylene using specified initiator systems.

In this experiment methylcyclohexane was used instead of n-hexane in the polymerization of isobutylene with the t-BudiCUOMe/TiCl$_4$/CH$_3$Cl: methylcyclohexane (40:60 v/v), at $-80°$ C. system in the absence and presence of a proton trap (DTBP) [t-BudiCUOMe]=$9.24\times10^{-4}$M; [TiCl$_4$]=$1.48\times10^{-2}$M. The results are summarized in FIG. 3.

EXAMPLE 4

Figure 4:
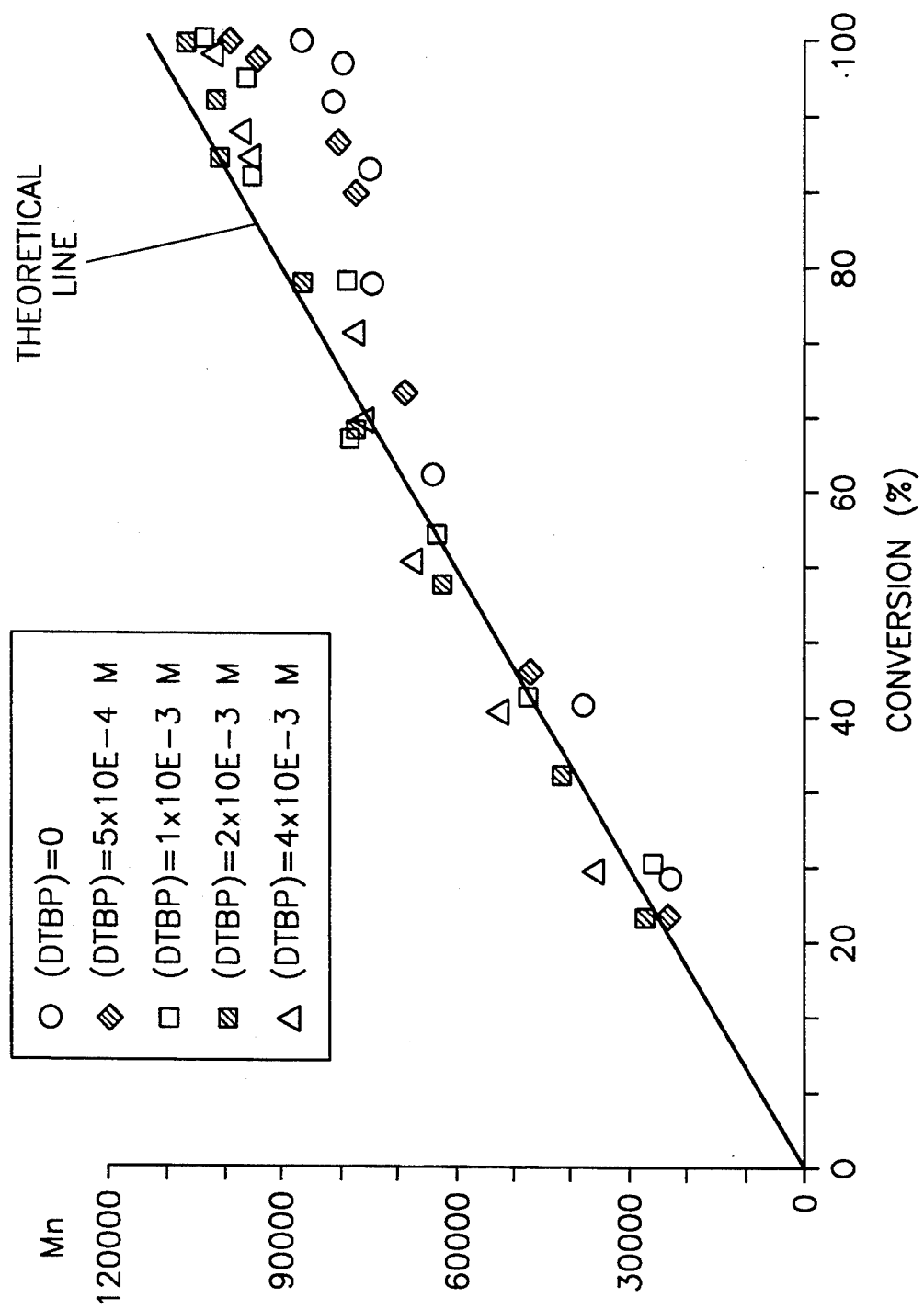
FIG. 4 is a graph showing the number average molecular weight versus monomer conversion (%) in the polymerization of isobutylene and a specified initiator system.
Figure 5:
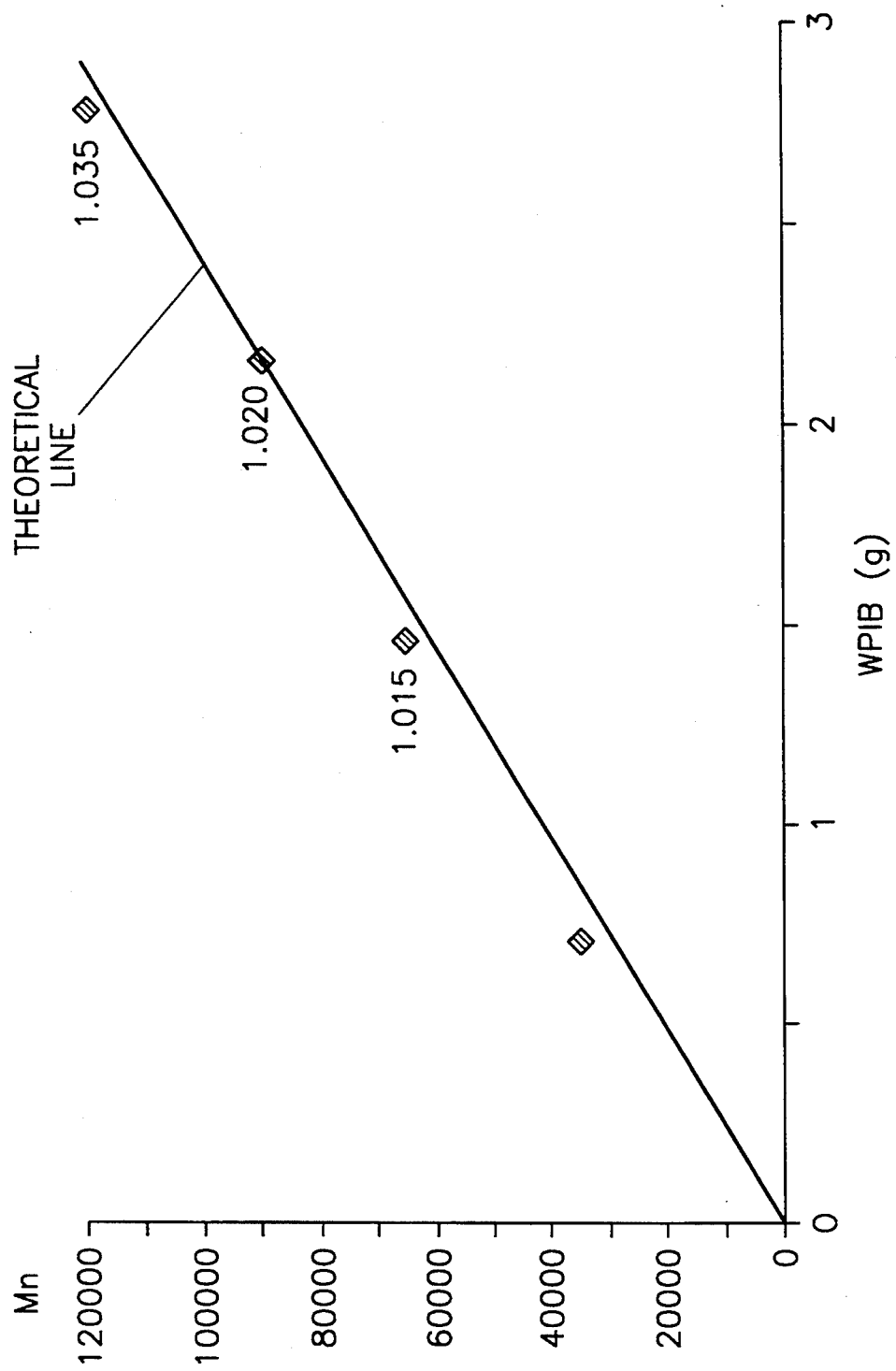
FIG. 5 is a graph showing number average molecular weight versus weight of polyisobutylene formed (g) in the polymerization of isobutylene and a specified initiator system.

In this example 5-tert.-butyl-1,3-dicumyl-chloride was used as initiator in the polymerization of isobutylene as follows:

Polymerization of IB with 5-tert.-butyl-1,3-dicumyl-chloride as initiator in the presence of proton trap DTBP. AMI technique, [IB]$_o$=2.04M [t-Bu-DiCuCl]=$1\times10^{-3}$M; [TiCl$_4$]=$1.6\times10^{-2}$M; $V_o$=25 mL. solvent: CH$_3$Cl:n-Hexane, 40:60 (v:v); Temperature: $-80°$ C. The results are summarized in FIG. 4.

EXAMPLE 5

In this example IMA technique was followed with 5-tert.-butyl-1,3-dicumyl-chloride as initiator. The experiment was conducted as follows:

Polymerization of IB initiated with 5-tert.-butyl-1,3-dicumyl-chloride. IMA technique ($4\times1$ ml); Time elapsed between monomer additions: 30 mins; [t-Bu-DiCuCl]=$1\times10^{-3}$M; [TiCl$_4$]=$1.6\times10^{-2}$M; $V_o$=25 mL [DTBP]=$1\times10^{-3}$M; Diluent: CH$_3$Cl:n-Hexane, 40:60 (v:v); Temperature: $-80°$ C. The numbers are MWD values. The results are summarized in Example 5.

EXAMPLE 6

Figure 6:
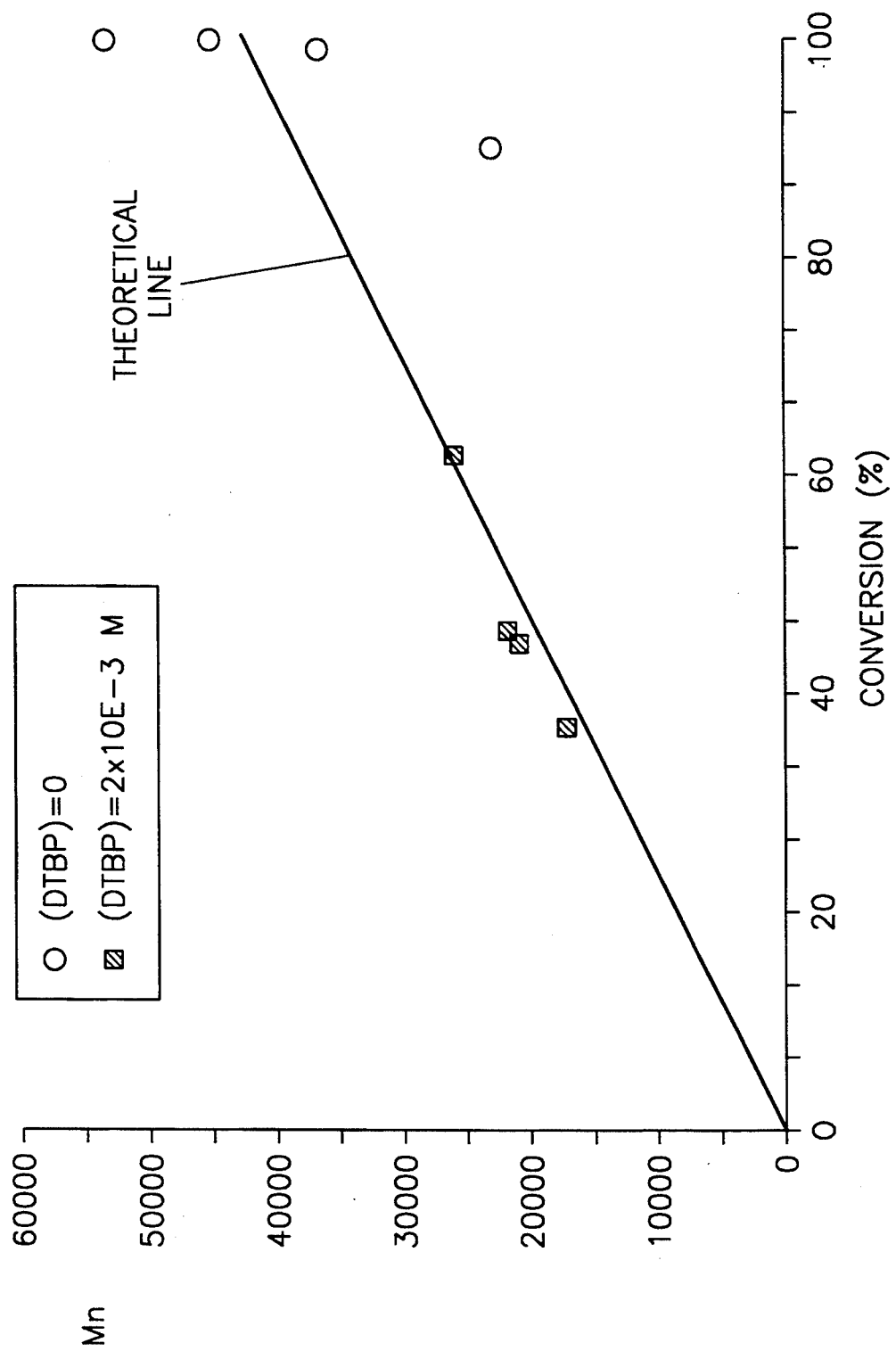
FIG. 6 is a graph showing number average molecular weight versus monomer conversion (%) in the polymerization of styrene and specified initiator systems.

In this example styrene was used as monomer as follows:

t-BudiCUOMe/TiCl$_4$/CH$_3$Cl:MeCH, 40:60 (v:v) system at minus $80°$ C. in the absence and presence of proton trap (DTBP). The results are summarized in FIG. 6.

As can be seen from Examples 1 to 6, when the polymerization experiments were carried out in the presence of proton trap (DTBP), deviations from the theoretical line decrease with increasing DTBP concentration and at [DTBP]=$1-2\times10^{-3}$ mole/l, close to theoretical molecular weights and narrow MWDs were observed. Independent measurements indicated that this concentration was equal to the concentration of protic impurities in the system.

Preparation of Triblock Copolymers

Based on Examples 1 to 6, related to the living polymerization of isobutylene and styrene, polymerization conditions were obtained under which living polymerization of isobutylene and styrene can be carried out by sequential monomer addition to obtain block copolymers. Block copolymerizations by sequential monomer addition were carried out in a 250 ml three neck flasks equipped with overhead stirrer.

Polymerization parameters:
[Initiator]=$1\times10^{-3}$M
[TiCl$_4$, Coinitiator]=$1.6\times10^{-2}$M
[DTBP]=$2\times10^{-3}$M
Diluent: MeCl/methylcyclohexane (40/60 v/v)
Temperature: $-80°$ C.
Isobutylene added: 12 ml (=8.4 g)
Styrene added: 3.9 ml
Styrene polymerization time: 5 minutes The method of monomer addition strongly affects the outcome of styrene polymerization: Using pure (undiluted) styrene leads to temporary freezing of this monomer at the moment of addition into the $-80°$ C. solution. Freezing can be eliminated by diluting the monomer. Using methylcyclohexane in volume ratio 1:4 (3.5 ml styrene +14 ml MeCH) the polar/apolar volume ratio of the reaction medium changed from 40:60 in favor of the apolar components (MeCH and St) at the beginning of St (styrene) polymerization. The properties of triblocks obtained can be compared from the stress-strain data.

EXAMPLE 7

In this example, 5-t-butyl-1,3-bis(1-methoxy-1-methylethyl)benzene initiator was used; undiluted styrene was added, and the DTBP concentration was $1 \times 10^{-3}$ M.

| Sample No. | PSt | PIB | PSt | $\overline{M}w/\overline{M}n$ |
|---|---|---|---|---|
| A | 15500 | 85000 | 15500 | 1.43 |

PSt means polystyrene
PIB means polyisobutylene $\overline{M}w/\overline{M}n$ is the ratio of weight average molecular weight to number average molecular weight.

EXAMPLE 8

In this example, 5-t-butyl-1,3 bis (1-acetoxy-1-methylethyl)benzene initiator was used; styrene was added undiluted.

| Sample No. | PSt | PIB | PSt | $\overline{M}w/\overline{M}n$ |
|---|---|---|---|---|
| B | 14300 | 78000 | 14300 | 1.53 |

EXAMPLE 9

In this example, 5-t-butyl-1,3 bis (1-chloro-1-methylethyl)benzene initiator was used; styrene was diluted with methyl cyclohexane (1/4; v/v) and the DTBP concentration was $1 \times 10^{-3}$ M.

| Sample No. | PSt | PIB | PSt | $\overline{M}w/\overline{M}n$ |
|---|---|---|---|---|
| C | 8066 | 70900 | 8066 | 1.13 |

EXAMPLE 10

In this example, same initiator was used as initiator used in Example 9; styrene was diluted with methyl cyclohexane (1/4; v/v).

| Sample No. | PSt | PIB | PSt | $\overline{M}w/\overline{M}n$ |
|---|---|---|---|---|
| D | 7082 | 82500 | 7082 | 1.11 |

EXAMPLE 11

In this example, same initiator as in Example 9 was used; styrene was diluted with methyl cyclohexane (1/4; v/v) and the DTBP concentration was $4 \times 10^{-3}$ M.

| Sample No. | PSt | PIB | PSt | $\overline{M}w/\overline{M}n$ |
|---|---|---|---|---|
| E | 7154 | 78200 | 7154 | 1.21 |

EXAMPLE 12

In this example, same initiator as in Example 9 was used; styrene was diluted with methyl cyclohexane (1/4; v/v), and the styrene reaction time was 10 minutes.

| Sample No. | PSt | PIB | PSt | $\overline{M}w/\overline{M}n$ |
|---|---|---|---|---|
| F | 14400 | 84000 | 14400 | 1.19 |

EXAMPLE 13

In this example, same initiator as in Example 9 was used; styrene was diluted with methyl cyclohexane (1/4; v/v), the polymerization temperature was minus 90° C., and the styrene reaction time was 10 minutes.

| Sample No. | PSt | PIB | PSt | $\overline{M}w/\overline{M}n$ |
|---|---|---|---|---|
| G | 6380 | 80300 | 6380 | 1.19 |

EXAMPLE 14

In this example, same initiator as in Example 9 was used; styrene was diluted with methyl cyclohexane (1/4; v/v), and the styrene reaction time was 15 minutes.

| Sample No. | PSt | PIB | PSt | $\overline{M}w/\overline{M}n$ |
|---|---|---|---|---|
| H | 13900 | 89300 | 13900 | 1.13 |

EXAMPLE 15

In this example, same initiator as in Example 9 was used; styrene was diluted with methyl cyclohexane (1/4; v/v), the polymerization temperature was minus 90° C., and the styrene reaction time was 15 minutes.

| Sample No. | PSt | PIB | PSt | $\overline{M}w/\overline{M}n$ |
|---|---|---|---|---|
| I | 14600 | 86900 | 14600 | 1.12 |

The Stress-Strain data are summarized in Table I.

TABLE I

| | Stress-Strain Data | | | | |
|---|---|---|---|---|---|
| Sample No. | 100% Mod. | 300% Mod. | 500% Mod. | Tensile Strength psi | Elongation % |
| A | 110 | 347 | 1084 | 1830 | 625 |
| B | 112 | 322 | 931 | 2195 | 615 |
| C | 45 | 55 | 84 | 490 | 1000 |
| D | 63 | 114 | 237 | 1898 | 865 |
| E | 40 | 75 | 135 | 725 | 850 |
| F | 85 | 221 | 947 | 2700 | 650 |
| G | 44 | 35 | 52 | 75 | 850 |
| H | 88 | 200 | 890 | 3000 | 690 |
| I | 85 | 197 | 967 | 3600 | 750 |

The test methods used are shown in Table II.

TABLE II

| Property | Test Method |
|---|---|
| 100% Modulus, psi | ASTM D412 |
| 300% Modulus, psi | ASTM D412 |
| 500% Modulus, psi | ASTM D412 |
| Tensile Strength, psi | ASTM D412 |
| Elongation, % | ASTM D412 |

EXAMPLE 16

In this example, 1-chloro, 2,4,4-trimethyl pentane was used as initiator. $[M]=2.0$M, $[I]=5.1 \times 10^{-2}$M,

[TiCl$_4$]=1.2×10$^{-1}$M, [DTBP]=2×10$^{-3}$M, temperature=−40° C., solvent: n-hexane-CH$_3$Cl 60/40 v/v. The PIB prepared this way had M$_n$=2200, MWD=1.14.

EXAMPLE 17

In this example, 2-chloro, 2-phenyl propane was used as initiator. [M]=3.7M, [I]=9.44×10$^{-2}$M, [TiCl$_4$]=1.9×10$^{-1}$=[DTBP]=2×10$^{-3}$M, temperature =−60° C., solvent: n-hexane-CH$_3$Cl, 60/40 v/v.
 a) The PIB obtained by the AMI technique exhibited M$_n$=2300, MWD=1.3.
 b) The PIB prepared by continuously feeding isobutylene, equivalent to the amount in example 16, to the solution containing the initiator, coinitiator and DTBP exhibited MWD=1.08.

EXAMPLE 18

A series of isobutylene polymerizations were carried out using large test tube immersed in a heptane bath at −40° C. under a nitrogen atmosphere in a MBraun M-150 glove box. The total volume of each reaction mixture was 25 ml. Using the AMI technique parallel runs were conducted. In this experiment, 2,4,4-trimethylpentyl chloride was used as the initiator with a DTBP as the proton trap.

The polymerization conditions were as follows:
[Initiator]=1.16×10$^{-3}$M
[Coinitiator]=2.52×10$^{-3}$
[DTBP]=2×10$^3$M
Solvent=MeCl
Temperature=−40° C.
[Isobutylene]=as stated in FIG. 7

Figure 7:
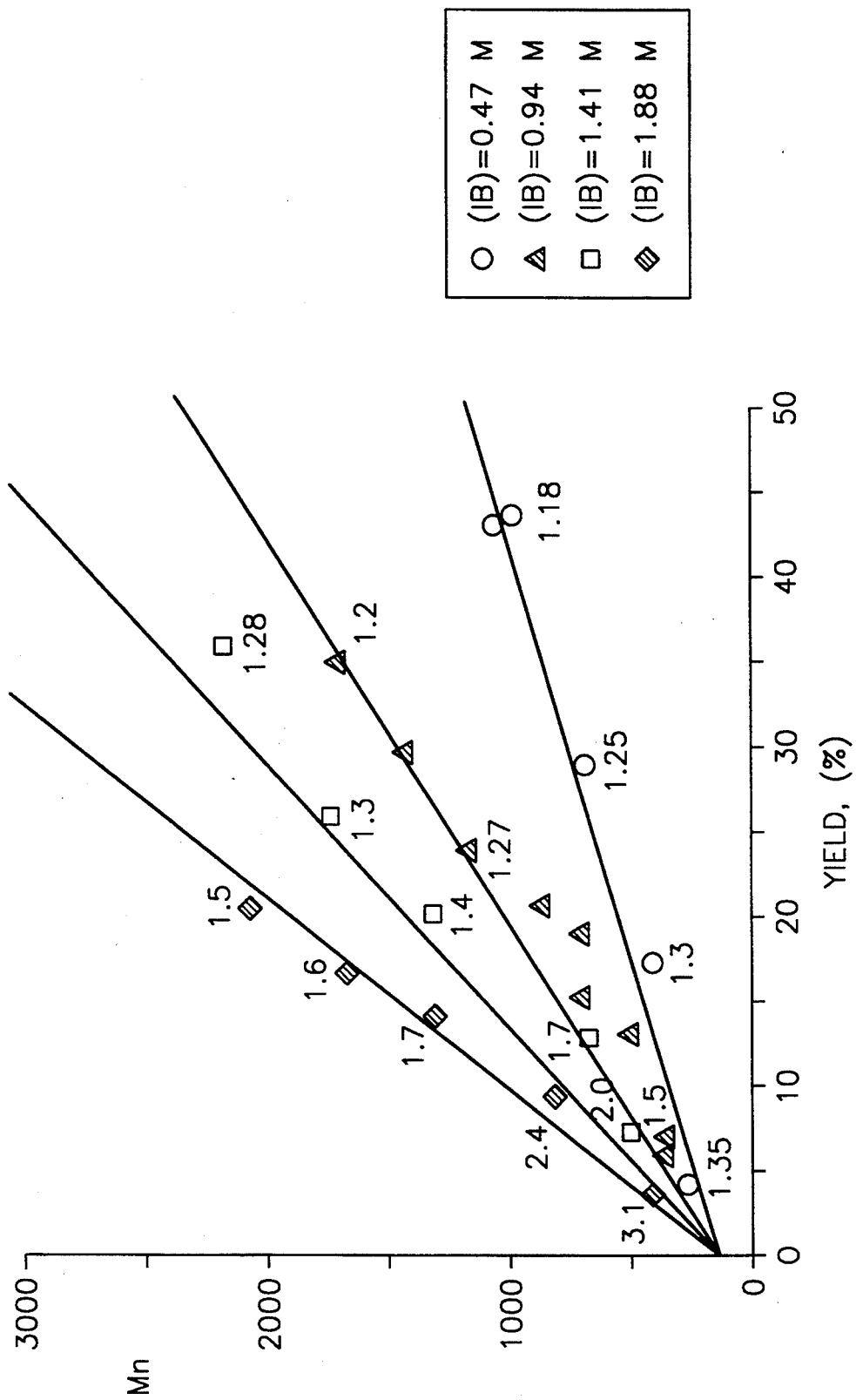
FIG. 7 is a graph showing the number average molecular weight versus monomer conversion (%) in the polymerization of isobutylene and a specified initiator system.

The results of the polymerization are summarized in FIG. 7. As a control, a run was conducted in the absence of an initiator. A minimal amount of polymer was obtained.

As seen from the data presented in FIG. 1, when the polymerizations were conducted in the presence of a proton trap, close to theoretical molecular weights and narrow molecular weight distributions were obtained.

EXAMPLE 19

Figure 8:
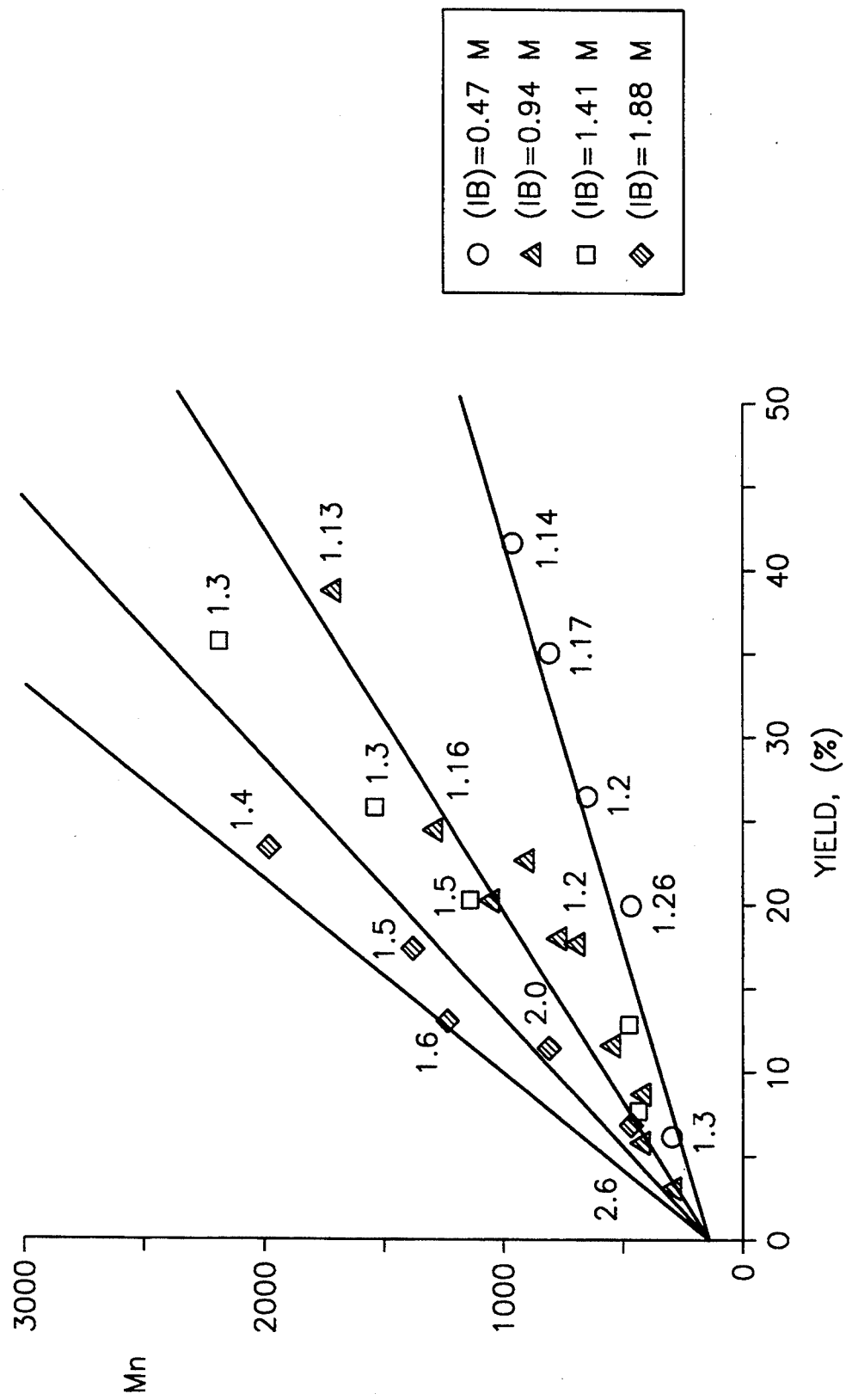
FIG. 8 is a graph showing the number average molecular weight versus monomer conversion (%) in the polymerization of isobutylene and a specified initiator system.

In this experiment, a series of polymerizations were conducted in the same manner as Example 18 except that Cumyl chloride was used as an initiator. The results of this series is summarized in FIG. 8.

What is claimed is:

1. A process for polymerizing an olefin which comprises the step of contacting an olefin chargestock with
 (A) an organic compound selected from the group consisting of an alcohol, an ether, an ester, an organic halide and mixtures thereof;
 (B) TiCl$_4$; and
 (C) a pyridine compound selected from the group consisting of 2,6-di-tert-butylpyridine, a substituted 2,6-di-tert-butylpyridine, and mixtures thereof;
at polymerization conditions in a polymerization zone, to produce a polymer.

2. The process of claim 1, wherein protic impurities are present in said polymerization zone and wherein said pyridine compound present in said zone is at least a stoichiometric amount relative to said protic impurities.

3. The process of claim 2, wherein said pyridine compound present in said zone is greater than a stoichiometric amount relative to said protic impurities.

4. The process of claim 1, wherein said substituted 2,6-di-tert-butyl pyridine is 2,6-di-tert-butyl-4-methylpyridine.

5. The process of claim 1 wherein the number of moles of TiCl$_4$ in said polymerization zone is present in at least a stoichiometric amount relative to said organic compound.

6. The process of claim 1, wherein the number of moles of said TiCl$_4$ ranges from 2 to 40 times the stoichiometric amount relative to said organic compound.

7. The process of claim 1, wherein said olefin chargestock comprises an olefin selected from the group consisting of C$_4$ to C$_7$ isomonoolefins, C$_4$ to C$_{14}$ multiolefins, vinylidene aromatic components and mixtures thereof.

8. A process for polymerizing an olefin which comprises the step of contacting an olefin chargestock with:
 (A) an organic halide;
 (B) VCL$_4$; and
 (C) a pyridine compound selected from the group consisting of 2,6-di-tert-butylpyridine, a substituted 2,6-di-tert-butylpyridine; and mixtures thereof at polymerization conditions in a polymerization zone, to produce a polymer.

9. The process of claim 8, wherein protic impurities are present in said polymerization zone and wherein said pyridine compound present in said zone is at least a stoichiometric amount relative to said protic impurities.

10. The process of claim 9, wherein said pyridine compound present in said zone is greater than said stoichiometric amount relative to said protic impurities.

11. The process of claim 8 wherein said substituted 2,6-di-tert-butylpyridine is 2,6-di-tert-butyl-4-methyl pyridine.

12. The process of claim 8 wherein the number of moles of said VCL$_4$ in said polymerization zone is at least a stoichiometric amount relative to said organic halide.

13. The process of claim 8 wherein said olefin chargestock comprises an olefin selected from the group consisting of C$_4$ to C$_7$ isomonoolefin, C$_4$ to C$_{14}$ multiolefins, vinylidene aromatic compounds and mixtures thereof.

* * * * *